Figure 1:
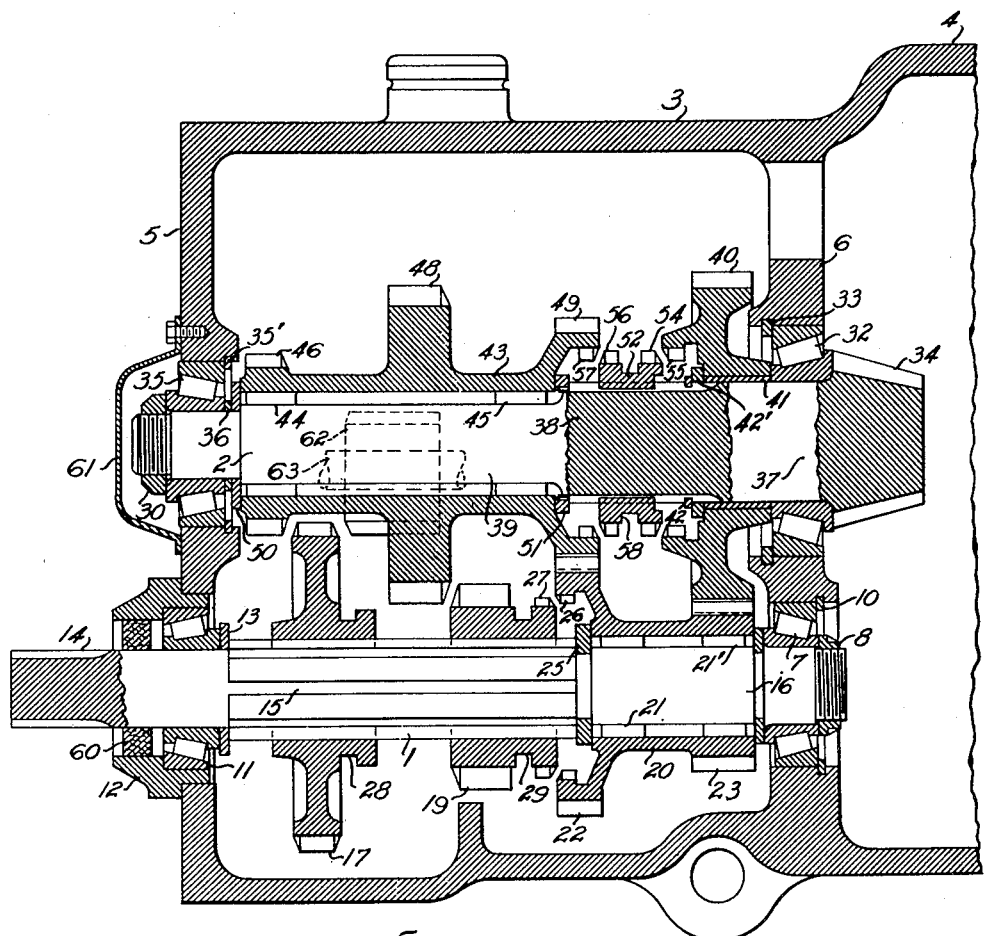

May 9, 1950      I. A. KAMLUKIN      2,506,670
POWER TRANSMITTING MECHANISM

Filed March 30, 1946      2 Sheets-Sheet 1

INVENTOR
Igor A. Kamlukin
BY
ATTORNEY

May 9, 1950     I. A. KAMLUKIN     2,506,670
POWER TRANSMITTING MECHANISM
Filed March 30, 1946     2 Sheets-Sheet 2

INVENTOR
Igor A. Kamlukin
BY
ATTORNEY

Patented May 9, 1950

2,506,670

UNITED STATES PATENT OFFICE 2,506,670

POWER TRANSMITTING MECHANISM

Igor A. Kamlukin, Milwaukee, Wis., assignor to Allis-Chalmers Manufacturing Company, Milwaukee, Wis., a corporation of Delaware Application March 30, 1946, Serial No. 658,500

6 Claims. (Cl. 74—359)

1

This invention relates to power transmitting mechanisms, and it is concerned more particularly with a change speed transmission for use in motor vehicles where it may serve to transmit power from the vehicle motor at different gear ratios to the drive gearing for the ground engaging propelling elements of the vehicle.

Transmissions for use in heavy duty motor vehicles, such as tractors, are usually required to provide for a relatively large number of available speeds, and in order to meet this requirement with a relatively small number of gears it has heretofore been suggested to incorporate in such transmissions a gear mechanism which enables the operator to preselect certain operating ranges of the transmission, say a high range and a low range, and to further incorporate in the transmission another gear mechanism for selectively establishing, in each range, a number of speeds, say a low speed and a high speed, or a forward speed and a reverse speed.

In certain types of these transmissions which have heretofore been proposed, and which are known as double range transmissions, an input shaft and a countershaft have been arranged either in axial alignment with each other or in spaced parallel relation to each other, and an output shaft has been arranged in spaced parallel relation to the input and countershafts. From the standpoint of simplicity and compactness of design these transmissions, as heretofore constructed, have not been entirely satisfactory, however, and their manufacturing costs have been relatively high.

Generally, it is an object of the invention, to provide an improved double range transmission which is extremely simple and compact in construction, efficient in operation and which lends itself to production at relatively low cost.

More specifically, it is an object of the invention to provide a double range transmission in which the range selecting gearing and the speed selecting gearing are arranged in such relation to the input and output shafts that these shafts will serve as the sole support for all of the range and speed selecting gearings, and in which a plurality of forward speeds may be selected in each range.

A further object of the invention is to provide a transmission of the character set forth hereinbefore, incorporating a reverse idler mounted independently of the input and output shafts, and in which one or more forward speeds and one reverse speed may be selected in each range.

A further object of the invention is to provide an improved double range transmission which readily lends itself for use in heavy duty motor vehicles, such as tractors.

The foregoing and other objects and advantages of the invention will become more fully apparent from the following description of a preferred embodiment of the invention shown in the accompanying drawings. Referring to the drawings in which like reference characters designate the same or similar parts in the various views:

Fig. 1 is a vertical longitudinal section through a change speed transmission affording six forward speeds and two reverse speeds, the transmission being shown in neutral position; and Figs. 2 to 9 are diagrammatic views showing different positions to which the transmission shown in Fig. 1 may be adjusted in order to establish the various speeds.

Referring to Fig. 1, a one-piece driving shaft I and a one-piece driven shaft 2 are mounted in vertically spaced relation in a housing 3 which may be constructed to form part of the body of a motor vehicle, such as a tractor, and which has a rearward extension 4 adapted to enclose a differential mechanism of such a vehicle. The housing 3 has a front wall 5, a transverse inner wall 6 and suitable side, bottom and top walls which, in conjunction with the walls 5 and 6 form a forward compartment of the housing 3 in which the transmission gearing is mounted. The driving shaft I extends longitudinally through the forward compartment of the housing 3 and is rotatably mounted at its rear end in a tapered roller bearing 7 which is mounted in an opening of the wall 6.

Threaded upon the shaft I, at its rear end is a retainer nut 8 which is suitably secured in adjusted position as by prick punching the nut 8 against the threaded portion of the shaft I. A retaining ring 10 for the bearing 7 is seated in an annular recess in the wall 6. The shaft I extends forwardly through an opening in the front wall 5 of the housing 3 and it is supported rearwardly of its forward end in a roller bearing II which is mounted in a bearing cap 12 secured to the front wall 5. A locating washer 13 for the bearing II is seated on the shaft I rearwardly of the bearing II.

Formed on the portion of shaft I which extends forwardly beyond the bearing II are splines 14, and a coupling or other suitable means, not shown, for connecting the shaft I in driven relation to a source of power, such as a vehicle motor, may be mounted on the splined forward portion of the shaft I. In the space between the bearings 7 and II the shaft has a splined portion 15 and a cylindrical portion 16, the root diameter of the splined portion being equal to or slightly larger than the diameter of the cylindrical portion 16.

Speed selecting gears 17 and 19 are supportingly mounted on the splined portion 15 of the shaft I in non-rotatable and axially slidable relation thereof; these gears having internal hub splines matching the splines of the shaft portion 15. Rearwardly of the shiftable gears 17 and 19 an integrally formed gear cluster 20 is rotatably mounted on the cylindrical portion 16 of the shaft 1 by means of roller bearings 21 and 21', which are interposed between the hub of the gear cluster 20 and the cylindrical surface of the shaft portion 16. The gear cluster 20 comprises gear sections 22 and 23, the pitch diameter of the gear section 22 being larger than the pitch diameter of the gear section 23. A locating washer 25 is seated in an annular groove in the shaft 1 intermediate the splined and cylindrical portions 15 and 16 of the shaft 1; the washer 25 forming a shoulder for axial abutment by the gear cluster 20. The gear section 22 is formed with a circular series of internal clutch teeth 26 adapted for engagement with a circular series of external clutch teeth 27 formed on an axial extension of the gear 19. The hubs of the gears 17 and 19 have, respectively, formed thereon grooves 28 and 29 adapted for engagement with shifting forks of a shift mechanism not shown.

The driven shaft 2 is mounted in a vertical plane through the axis of the driving shaft 1, and is rotatably supported within the housing 3 in vertically spaced parallel relation to the driving shaft 1 by tapered roller bearings 32 and 35. The roller bearing 32 is mounted in an opening in the wall 6 of the housing 3, and a retaining ring 33 for the bearing 32 is seated in an annular recess of the wall 6 forwardly of the bearing 32. The roller bearing 35 is similarly mounted in an opening of the front wall 5 and a retaining ring 35' for the bearing 35 is seated in an annular recess in the wall 5 rearwardly of the bearing 35. A spacer 36 is mounted on the shaft 2 adjacent to and rearwardly of the inner race of the bearing 35. A retainer nut 30 is threaded upon the shaft 2 at it forward end against the inner race of the bearing 35, and the nut 30 is suitably secured in adjusted position as by prick punching the nut 30 against the shaft 2. Integrally formed with the shaft 2 at its rear end and extending into the rearward extension 4 of the housing 3 is a bevel pinion 34 adapted for cooperation with a suitable driving mechanism such as a differential gearing of a motor vehicle.

Adjacent to and forwardly of the bevel pinion 34, the shaft 2 has a cylindrical portion 37 upon which is mounted the inner race of the bearing 32 and a cylindrical bushing 41. A gear 40 in constant mesh with the gear section 23 of the cluster gear 20 is rotatably mounted on the bushing 41 in a position adjacent to the bearing 32. Forwardly of the cylindrical portion 37 the shaft 2 has a relatively short splined portion 38, and forwardly of the splined portion 38 the shaft 2 has a relatively long cylindrical portion 39. A snap ring 42 is seated in an annular groove in the splined shaft portion 38, and a washer 42' is interposed between the snap ring 42 and the gear 40 to form a shoulder for axial abutment by the gear 40. Forwardly of the gear 40 and on the cylindrical portion 39 of the shaft 2, an integrally formed gear cluster 43 is rotatably mounted by means of a pair of roller bearings 44 and 45 which are interposed between the hub of said gear cluster and the cylindrical surface of the shaft portion 39. The gear cluster 43 comprises a forward gear section 46, an intermediate gear section 48 and a rearward gear section 49, the last named gear section being in constant mesh with the gear section 22 of the gear cluster 20. The pitch diameter of the gear section 46 is smaller than the pitch diameter of the shiftable gear 17, and the gear section 46 and the gear 17 are so proportioned that the gear 17 may be shifted forwardly from its neutral position in which it is shown in Fig. 1 into meshing engagement with the gear section 46 of the gear cluster 43. The intermediate gear section 48 of the gear cluster 43 is of larger pitch diameter than the gear sections 46 and 49 and also of larger pitch diameter than the shiftable gear 19; gear section 48 and the gear 19 being so proportioned that the gear 19 may be shifted forwardly from the neutral position in which it is shown in Fig. 1 into mesh with the gear section 48 of the gear cluster 43. On the other hand, the gear 19 may be shifted rearwardly from the neutral position shown in Fig. 1 into clutching engagement with the gear cluster 20, the gear 19 and the gear section 22 being provided with relatively engageable clutch teeth 27 and 26, respectively, as has been pointed out hereinbefore.

A locating washer 50 and a locating ring 51 are mounted on the shaft 2 at the axially opposite ends of the gear cluster 43, the ring 51 being seated against the forward ends of the splines on the shaft portion 38 and the washer 50 being seated against the spacer 36. The gear cluster 43 is thus secured against substantial axial displacement relative to the shaft 2.

A clutch collar 52 is non-rotatably and shiftably mounted on the splined portion 38 of the shaft 2 intermediate the gear 40 and the gear cluster 43; the clutch collar 52 having internal splines matching the splines on the shaft portion 38. The collar 52 has formed on its rearward portion an annular series of clutch teeth 54 adapted for engagement with a series of internal clutch teeth 55 formed in the hub of the gear 40. Another annular series of clutch teeth 56 are formed on the forward portion of the collar 52, the clutch teeth 56 being adapted for engagement with a series of internal clutch teeth 57 formed in the gear section 49 of the gear cluster 43. A groove 58 is formed on the collar 52 intermediate the teeth 54 and 56, the groove 58 being adapted for engagement with a shifting fork of a shift mechanism, not shown.

A reverse idler 62, indicated in dotted lines, is rotatably mounted on a countershaft 63 also indicated in dotted lines, and the countershaft 63, in turn, is mounted on the housing 3 in such position that the reverse idler 62 will be in constant mesh with the gear section 48 of the gear cluster 43. The mounting of the countershaft 63 on the housing 3 is not indicated in detail, but it will be understood that the housing 3 is suitably constructed to provide for such mounting of the countershaft 63. The teeth of the reverse idler 62 are about twice as long, axially, as the teeth of the gear section 48 of the gear cluster 43, and the circumferential and axial relation of the reverse idler 62 to the gear section 48 of the gear cluster 43 is such that the gear 17 may be brought into mesh with the reverse idler 62 upon rearward shifting of the gear 17 from the neutral position in which it is shown in Fig. 1.

In order to prevent loss of lubricant from the housing 3 through the roller bearing 11, an oil seal 60 is mounted in the bearing cap 12 adjacent to and forward of the said bearing and in constant wiping contact with the shaft 1. To prevent lubricant from escaping through the bearing 35, a cap 61 is securely fastened to the front wall 5 at a position concentric to and forward of the shaft 1.

When the transmission is in neutral, which condition is illustrated, as mentioned hereinbefore, by Fig. 1, the gear 40 which represents a first gear element, and the gear cluster 20, which represents an auxiliary gear means, are freely rotatable on the driven and driving shafts, respectively, and the gear cluster 43 which represents a second gear element is freely rotatable on the driven shaft. The gears 17 and 19 are splined on the driving shaft and therefore rotate in unison with said shaft when the latter is rotated by engine power while the transmission is in neutral.

Figure 2:
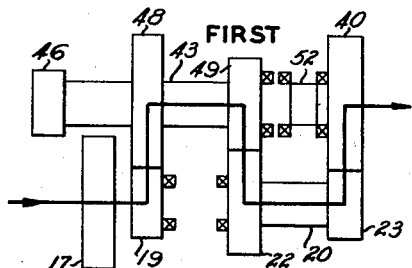

First or lowest speed is established by clutching gear 40 to the driven shaft 2 through the clutch collar 52, and by moving gear 19 into meshing engagement with the gear section 48 of the gear cluster 43. This condition is illustrated by Fig. 2, and the power flow, as indicated by the heavy line in said figure, is from the input shaft 1 through the gears 19, 48, permanent mesh gears 49, 22, permanent mesh gears 23, 40 and clutch collar 52 to the output shaft 2.

Figure 3:
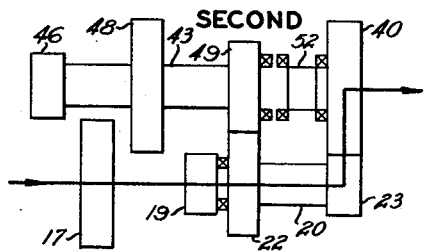

Next highest or second speed is established by clutching gear 40 to the driven shaft 2, the same as in first or lowest speed, and by moving gear 19 into clutching engagement with the gear cluster 20. This condition is illustrated in Fig. 3, and the power flow, as indicated by the heavy line in said figure, is from the input shaft 1 through the permanent mesh gears 23, 40 and clutch collar 52 to the output shaft.

Figure 4:
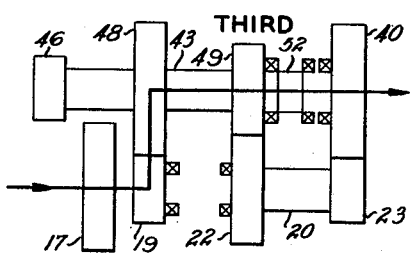

Next highest or third speed is established by clutching gear cluster 43 to the output shaft 2 through clutch collar 52, and by moving gear 19 into meshing engagement with the gear section 48 of the gear cluster 43. This condition is illustrated in Fig. 4, and the power flow as indicated by the heavy line in said figure, is from the input shaft 1 through gears 19, 48 and clutch collar 52 to the output shaft.

Figure 5:
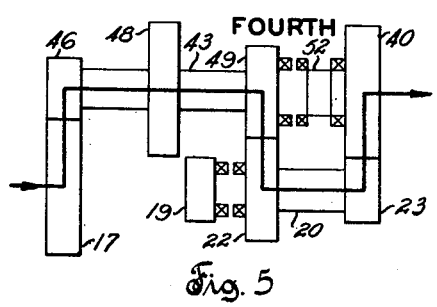

Next highest or fourth speed is established by clutching gear 40 to the output shaft through clutch collar 52, and by moving gear 17 into meshing engagement with the gear section 46 of the gear cluster 43. This condition is illustrated in Fig. 5, and the power flow as indicated by the heavy line in said figure, is from the input shaft 1 through gears 17, 46, permanent mesh gears 49, 22, permanent mesh gears 23, 40 and clutch collar 52 to the output shaft.

Figure 6:
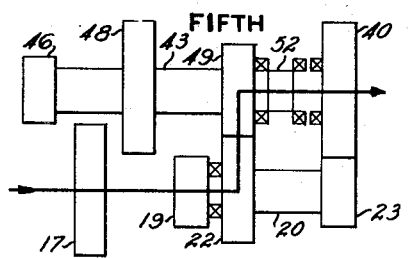

Next highest or fifth speed is established by clutching gear cluster 43 to the output shaft through clutch collar 52, and by moving gear 19 into clutching engagement with the gear cluster 20. This condition is illustrated in Fig. 6, and the power flow as indicated by the heavy line in said figure, is from the input shaft 1 through permanent mesh gears 22, 49 and clutch collar 52 to the output shaft.

Figure 7:
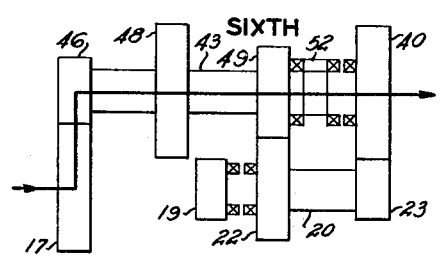

Highest or sixth speed is established by clutching gear cluster 43 to the output shaft through clutch collar 52 and by moving gear 17 into meshing engagement with gear section 46 of the gear cluster 43. This condition is illustrated in Fig. 7, and the power flow as indicated by the heavy line in said figure, is from the input shaft 1 through gears 17, 46 and clutch collar 52 to the output shaft.

Figure 8:
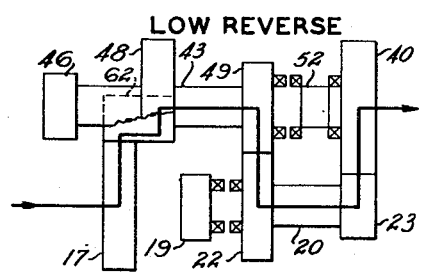

Low reverse is established by clutching gear 40 to the output shaft through clutch collar 52, and by moving gear 17 into meshing engagement with reverse idler 62. This condition is illustrated in Fig. 8, and the power flow as indicated by the heavy line in said figure, is from input shaft 1 through gears 17, 62, 48, permanent mesh gears 49, 22, permanent mesh gears 23, 40 and clutch collar 52 to the output shaft.

High reverse is established by clutching gear cluster 43 to the output shaft through clutch collar 52, and by moving gear 17 into meshing engagement with reverse idler 62. This condition is illustrated in Fig. 9, and the power flow as indicated by the heavy line in said figure, is from input shaft 1, through gears 17, 62, 48 and clutch collar 52 to the output shaft.

Figure 9:
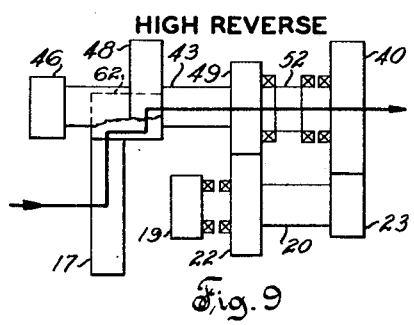

In order to effect the shifting of the gears 17 and 19 and of the clutch collar 52 into the various positions and proper relations to each other as discussed hereinbefore with reference to Figs. 2 and 9, the transmission may be provided with a suitable shift mechanism constructed in accordance with well established principles and including the usual shifting forks, selector rods and one or two manually operable shift levers.

Referring again to Figs. 2 to 9, it will be noted that the gear 40 is clutched to the shaft 2 through the clutch collar 52 for establishing first, second, fourth and low reverse speeds, and that the gear cluster 43 is clutched to the shaft through the clutch collar 52 for establishing third, fifth, sixth and high reverse speeds. In other words, the clutching engagement of the clutch collar 52 with the gear 40 establishes one operating range of the transmission, in which first, second, fourth or low reverse speed may be selected, and clutching engagement of the clutch collar 52 with the gear cluster 43 establishes another operating range of the transmission in which third, fifth, sixth or high reverse speed may be selected.

Considering the gear cluster 20, the gear 48 with its clutch teeth 55, the gear 49 with its clutch teeth 57, and the clutch collar 52 as range selecting gearing, and further considering the gears 17, 19, the gear sections 46 and 48 of cluster gear 43, and the clutch comprising clutch teeth 26 and 27, as speed selecting gearing, it will be seen that the range selecting gearing and the speed selecting gearing are arranged in such relation to the input shaft 1 and to output shaft 2, that these two shafts serve as the sole support for all of the range and speed selecting gearings. The reverse idler 62 is mounted independently of the input and output shafts, and provides for one reverse speed in each range, as has been explained hereinbefore.

It should be understood that the invention claimed herein is not limited to the exact details of design and construction disclosed, and that it is contemplated as including modifications within the scope of the appended claims.

It is claimed and desired to secure by Letters Patent:

1. A change speed transmission comprising, a support, a driving shaft, a driven shaft, bearing means rotatably mounting said shafts on said support in spaced parallel relation to each other, a first gear element supportingly mounted on one of said shafts for rotation relative thereto, an auxiliary gear means supportingly mounted on the other of said shafts for rotation relative thereto and connected in permanently geared relation with said first gear element, a second gear element supportingly mounted on said one shaft for rotation relative thereto independently of said first gear element and connected in permanently geared relation with said auxiliary gear means, means selectively operable to connect said one shaft and said second gear element in power transmitting relation to each other either through said auxiliary gear means and said first gear element or independently thereof, and means selectively operable to establish a forward or a reverse driving connection between said other shaft and said second gear element.

2. A change speed transmission comprising, a support, a driving shaft, a driven shaft, bearing means rotatably mounting said driving and driven shafts on said support in spaced parallel relation to each other, a first gear element supportingly mounted on one of said shafts for rotation relative thereto, an auxiliary gear means supportingly mounted on the other of said shafts for rotation relative thereto and connected in permanently geared relation with said first gear element, a second gear element supportingly mounted on said one shaft for rotation relative thereto independently of said first gear element and connected in permanently geared relation with said auxiliary gear means, means selectively operable to connect said one shaft and said second gear element in power transmitting relation to each other either through said auxiliary gear means and said first gear element or independently thereof, means selectively operable to establish a forward or a reverse driving connection between said other shaft and said second gear element, and disengageable power transmitting means operable to connect said other shaft and said auxiliary gear means in power transmitting relation to each other independently of said second gear element.

3. A change speed transmission comprising, a support, a driving shaft, a driven shaft, bearing means rotatably mounting said driving and driven shafts on said support in spaced parallel relation to each other, a first gear element supportingly mounted on one of said shafts for rotation relative thereto, a first gear cluster supportingly mounted on the other of said shafts for rotation relative thereto and having a gear section in constant mesh with said first gear element, a second gear cluster supportingly mounted on said one shaft for rotation relative thereto independently of said first gear element and having a gear section in constant mesh with another gear section of said first gear cluster, power transmitting means operable to connect said one shaft alternatively with said first gear element or with said second gear cluster; an axially shiftable gear non-rotatably mounted on said other shaft and movable from a neutral position in one direction into clutching engagement with said first gear cluster and, in the opposite direction, into meshing engagement with another gear section of said second gear cluster.

4. A change speed transmission comprising, a support, a driving shaft, a driven shaft, bearing means rotatably mounting said driving and driven shafts on said support in spaced parallel relation to each other, a first gear element supportingly mounted on one of said shafts for rotation relative thereto, a first gear cluster supportingly mounted on the other of said shafts for rotation relative thereto and having a gear section in constant mesh with said first gear element, a second gear cluster supportingly mounted on said one shaft for rotation relative thereto independently of said first gear element and having a gear section in constant mesh with another gear section of said first gear cluster, an axially shiftable clutch element non-rotatably connected with said one shaft intermediate said first gear element and said second gear cluster and movable from a neutral position in one direction into clutching engagement with said first gear element, and in the opposite direction into clutching engagement with said second gear cluster, and an axially shiftable gear non-rotatably mounted on said other shaft and movable from a neutral position in one direction into clutching engagement with said first gear cluster and, in the opposite direction, into meshing engagement with another gear section of said second gear cluster.

5. A change speed transmission comprising, a support, a driving shaft, a driven shaft, bearing means rotatably mounting said driving and driven shafts on said support in spaced parallel relation to each other, a first gear element supportingly mounted on said driven shaft for rotation relative thereto, a first gear cluster supportingly mounted on said driving shaft for rotation relative thereto and having a gear section in constant mesh with said first gear element, a second gear cluster supportingly mounted on said driven shaft for rotation relative thereto independently of said first gear element and having a gear section in constant mesh with another gear section of said first gear cluster, an axially shiftable clutch collar non-rotatably connected with said driven shaft intermediate said first gear element and said second gear cluster and movable from a neutral position in one direction into clutching engagement with said first gear element, and in the opposite direction into clutching engagement with said second gear cluster, and an axially shiftable gear non-rotatably mounted on said driving shaft and movable from a neutral position in one direction into clutching engagement with said first gear cluster and, in the opposite direction, into meshing engagement with another gear section of said second gear cluster.

6. A change speed transmission comprising a support, a driving shaft, a driven shaft, bearing means rotatably mounting said shafts on said support in spaced parallel relation to each other, a first gear element supportingly mounted on said driven shaft for rotation relative thereto, a first gear cluster supportingly mounted on the driving shaft and having a gear section in constant mesh with said first gear element, a second gear cluster supportingly mounted on said driven shaft for rotation relative thereto independently of said first gear element and having a gear section in constant mesh with another gear section of said first gear cluster, an axially shiftable clutch collar nonrotatably mounted on said driven shaft and movable from a neutral position in one direction into clutching engagement with said first gear element, and in the opposite direction into clutching engagement with said second gear cluster, and an axially shiftable gear nonrotatably mounted on said driving shaft and movable from a neutral position in one direction into meshing engagement with said second gear cluster, and in the other direction into meshing engagement with an idler having constant mesh with said second gear cluster whereby a reverse driving connection is established between said driving shaft and said driven shaft.

IGOR A. KAMLUKIN.

REFERENCES CITED

The following references are of record in the file of this patent:

UNITED STATES PATENTS

| Number | Name | Date |
|---|---|---|
| 1,750,555 | Whipp | Mar. 11, 1930 |
| 2,220,541 | Peterson | Nov. 5, 1940 |
| 2,461,027 | Bodmer | Feb. 8, 1949 |